United States Patent [19]
Hotellier

(10) Patent No.: US 6,547,389 B2
(45) Date of Patent: Apr. 15, 2003

(54) RESILIENT ARTICULATION COMPONENT FOR AN OPTICAL FRAME

(75) Inventor: Christophe Hotellier, Morez (FR)

(73) Assignee: Chevassus S.A., Morez (FR)

( * ) Notice: Subject to any disclaimer, the term of this patent is extended or adjusted under 35 U.S.C. 154(b) by 0 days.

(21) Appl. No.: 09/992,384

(22) Filed: Nov. 6, 2001

(65) Prior Publication Data

US 2002/0092960 A1 Jul. 18, 2002

Related U.S. Application Data

(63) Continuation of application No. PCT/IB00/00582, filed on May 5, 2000.

(30) Foreign Application Priority Data

May 6, 1999 (FR) .............................................. 99 06124

(51) Int. Cl.[7] ................................................ G02C 5/22
(52) U.S. Cl. ......................... 351/153; 351/114; 16/228
(58) Field of Search ................................ 351/113, 114, 351/153; 16/228

(56) References Cited

U.S. PATENT DOCUMENTS 5,400,090 A * 3/1995 Chen ........................... 351/113
5,657,107 A * 8/1997 Wagher et al. ............... 351/113
6,241,354 B1 * 6/2001 Schuchard et al. ........... 351/113

FOREIGN PATENT DOCUMENTS

| DE | 197 35 230 | * 2/1999 | .................. 351/113 |
| EP | 0 615 149 | 9/1994 | |
| EP | 0 856 763 | 8/1998 | |
| FR | 2 694 643 | 2/1994 | |
| FR | 2 739 197 | 3/1997 | |
| WO | 96 29623 | 9/1996 | |

* cited by examiner

Primary Examiner—Huy Mai
(74) Attorney, Agent, or Firm—Sturm & Fix LLP

(57) ABSTRACT

The invention concerns an elastic articulating component for an optical frame, comprising a case (1), a slide (3) arranged inside the case, a locking socket (11) which itself mounted around the slide. The socket has an elastic tab (1) to block the socket relative to the case (1) when the latter is moved relative to an articulating knuckle (13) against the compression of a spring (7). The invention is characterised in that the case (1) has a housing (5) for guiding the slide (3) in translation inside the case, and the elastic tab (19) is inserted into an aperture (21) of the case (10) emerging into the housing (5). This arrangement enables to reduce play when the slide is being guided in translation inside the case and provides greater facility for maintaining the tab in the case. Advantageously, it enables for reduce the width of the case, thereby enhancing the aesthetic appearance of the frame.

1 Claim, 2 Drawing Sheets

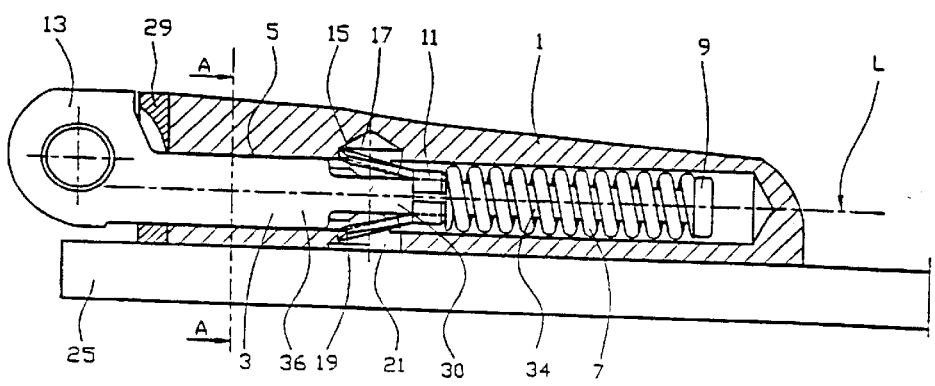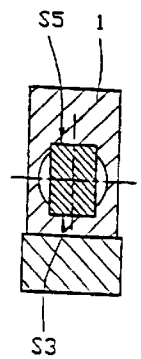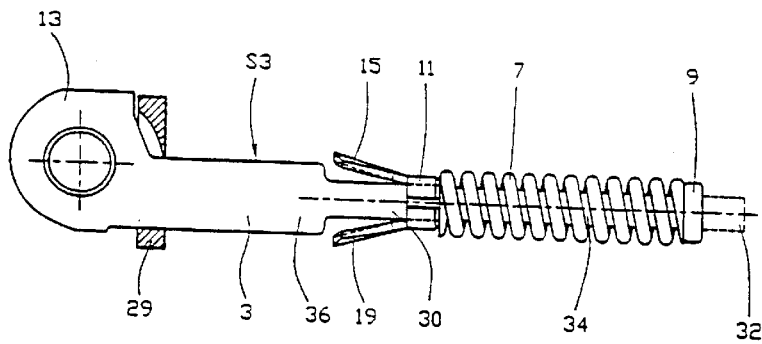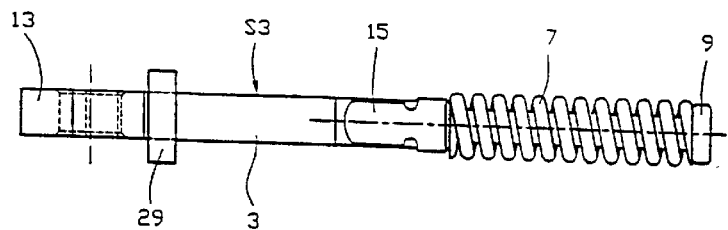

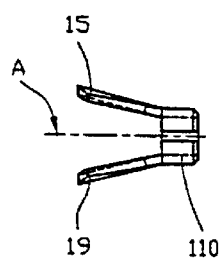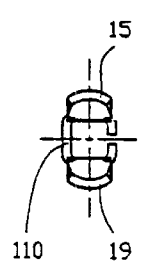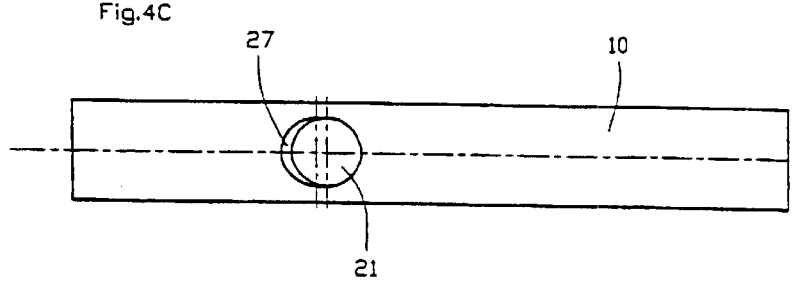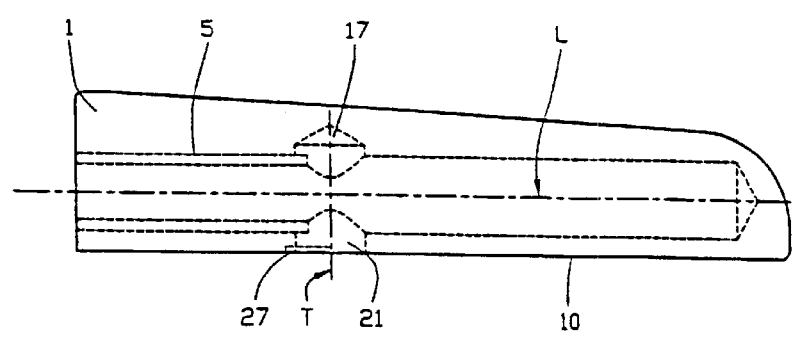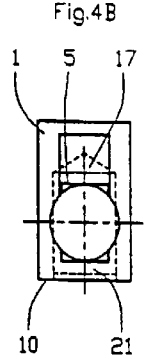

RESILIENT ARTICULATION COMPONENT FOR AN OPTICAL FRAME

CROSS-REFERENCE TO RELATED APPLICATIONS

This application is a continuation application, which is being filed as the national phase of International Application No. PCT/IB00/00582 filed May 5, 2000, which claims priority of French Patent Application No. 99.06124 filed May 6, 1999 and is hereby incorporated herein by reference.

BACKGROUND OF THE INVENTION

1. Field of the Invention

The invention relates to a resilient articulation component for an optical frame.

2. Description of Related Art

More particularly the invention relates to a resilient articulating component for an optical frame, which comprises a case and a slide which is disposed inside the case. A spring is fitted around the slide, between a stop and a locking socket, which itself is fitted around the slide. An articulating knuckle, which is integral with the slide, projects outside the case.

A resilient articulating component for an optical frame of the type described below is known in particular from document FR 2 694 643 published on Feb. 11th 1994.

According to an embodiment described in this document, the case has a slot, in which a projecting part of the slide is inserted. This arrangement makes it possible both to connect the slide and the case in rotation, and to guide the translation of the slide relative to the case. It is found however that the guiding is limited to the longitudinal dimension of the slot. In addition, the case has a receptacle with a circular cross-section, which is complementary to a cross-section of the socket fitted around the slide. Thus, the guiding in translation of the slide inside the receptacle is completed by guiding in translation of the slide, between the tabs of the socket. However, in the region of the receptacle in which the socket acts as a guide for the slide, the guiding play between the receptacle, the socket and the slide are accumulated, such that this can result in relatively substantial play, during translation of the slide relative to the case.

It is also found in this known embodiment that the socket has two resilient tabs, which are inserted in two retention areas of the receptacle of the case. These two areas are formed by a groove, which requires machining by means of a groove tool inserted inside the case. Taking into account the dimensions of the cases of articulation components in the field of optical frames, the insertion of the tool into the longitudinal receptacle, and machining of the retention areas to a certain depth of the receptacle, are operations which are problematic to carry out.

In addition, the deployment of the resilient tabs of the socket is carried out in a direction which is defined conventionally by the width of the case. This results in an arrangement which imposes the width as a restrictive dimension of the case.

BRIEF SUMMARY OF THE INVENTION

The resilient articulating component is designed to be secured to an arm of an optical frame, and is articulated on a second articulating component, which itself is secured to a front tenon of the frame, in order to form a frame hinge. An articulating shaft connects the knuckle of the resilient articulating component to two cam-type knuckles, which are integral with the second articulating component.

The cam is shaped in order to compress the spring of the resilient articulating component more strongly when the arm is in a position of intermediate pivoting, between a position of closure and a position of normal opening. This results in resilient return of the arm towards one or the other of these two positions, thus imparting a stable nature to the positions.

In the position of normal opening, the arm is supported against the front tenon of the frame. If the arm is moved beyond the position of normal opening, pressure is exerted once more on the case, relative to the knuckle, against the compression of the spring. This results in resilient return of the arm, thus imparting an unstable nature to the latter, in the position of excessive opening.

One of the objects of the invention is to reduce the play of guiding in translation of the slide in the case, and to form more easily areas of retention in the receptacle of the case, in a resilient articulating component for an optical frame of the type previously described.

For this purpose, the object of the invention is a resilient articulating component for an optical frame, comprising a case, a slide which is disposed inside the case, a spring which is fitted around the slide, between a stop and a locking socket, which itself is fitted around the slide, and an articulating knuckle, which is integral with the slide, and projects outside the case, wherein the socket has a resilient tab in order to lock the socket relative to the case, when the latter is displaced relative to the articulating knuckle, against the compression of the spring, characterised in that the case has a receptacle to guide the slide in translation inside the case, and the locking socket has a resilient tab, which is inserted in an aperture in the case, which opens into the receptacle.

The receptacle has a section which is complementary to a section of the slide, in order to guide the latter in translation in the case, independently of the locking socket. This arrangement makes it possible to reduce the guiding play between the slide and the case. Preferably, the guiding section is polygonal, in order to connect the slide and the case in rotation.

The retention aperture of the socket is formed by perforating the case. This arrangement provides great simplification in relation to machining inside the receptacle.

According to a particular embodiment of the invention, the socket has a second resilient tab, which is inserted in a recess in the receptacle. The aperture is formed in a base for securing the case to an arm of the frame, and the recess is aligned with the aperture, according to a direction which is perpendicular to the base for securing.

This direction defines the height of the case. Thus, the resilient tabs of the socket are deployed in the height, which makes it possible to reduce the dimension in a perpendicular direction, i.e. conventionally in the width of the case. In addition, the aperture in the base is concealed by securing the case onto a frame arm. Advantageously, the aperture and the cavity are obtained simultaneously by an operation of perforation perpendicularly to the base.

Other advantages of the invention will become apparent from reading the description of an embodiment illustrated by the drawings.

BRIEF DESCRIPTION OF THE DRAWINGS

FIG. 1A is a view in longitudinal cross-section of a resilient articulating component for an optical frame.

FIG. 1B is a view in transverse cross-section of the resilient articulating component.

FIG. 2A is a front view of the slide of the component provided with the locking socket and the return spring.

FIG. 2B is a plan view of the slide.

FIG. 3A is a front view of the locking socket.

FIG. 3B is a lateral view of the socket.

FIG. 4A is a front view of the case of the component.

FIG. 4B is a lateral view of the case.

FIG. 4C is a view from beneath of the case.

DETAILED DESCRIPTION OF THE INVENTION

In the continuation of the description, the same element bears the same reference in different figures.

A resilient articulating component for an optical frame, represented by FIG. 1A, comprises a case 1, which extends in a longitudinal direction L, and a slide 3 which is disposed inside the case, in the longitudinal direction. A spring 7 is fitted between a stop 9 and a locking socket 11, around a rod 34, forming an integral part of the slide. The socket itself is fitted around the rod 34. An articulating knuckle 13 which is integral with the slide projects relative to the case.

The locking socket 11, which can also be seen in FIGS. 3A and 3B, is a cut and rolled part, which has a base 110 with a square cross-section, which is complementary to the square cross-section of an end 30 of the rod 34. This arrangement makes it possible to connect the two elements in rotation, and increases the support surface of the spring against the socket.

According to the invention, firstly, the case 1 has a receptacle 5 for guiding the slide 3 in translation. As can be seen in FIG. 1B, the receptacle 5 has a cross-section S5 with rectangular shape, and, more generally, a polygonal shape. As can be seen in FIGS. 2A and 2B, the slide 3 also has a guiding part 36 with a rectangular or polygonal cross-section S3, which is complementary to the cross-section of the receptacle 5, in order to permit guiding in translation of the slide inside the case. In addition, the rectangular or polygonal shape of the two cross-sections makes it possible to connect the two elements in rotation.

This arrangement limits the guiding play between the slide and the case at these two elements. In other words, the locking socket is not designed as an intermediate guiding part between the slide and the case.

It should be noted that the rod 34, as well as the guiding part 36, and the knuckle 13 of the slide 3, are produced by being cut in a single piece, or are assembled, for example by being crimped or glued. In the case of crimping, the end of the rod 34 is notched, and is inserted in a longitudinal bore in the slide.

In addition, the socket has a first resilient tab 19, which is inserted in an aperture 21 in the case 1, which opens into the receptacle 5. As previously stated, the aperture 21 is formed by piercing of the case, which provides great simplification in relation to machining carried inside the receptacle.

FIGS. 4A and 4B illustrate a preferred embodiment of the articulating component, in which the socket 11 has a second resilient tab 15, which is inserted in a recess 17 in the receptacle 5. The aperture 21 is formed in a base 10 for securing of the case 1 to a frame arm 25, and the recess 17 is aligned in a direction T which is perpendicular to the base 10 for securing.

As previously stated, this direction T defines the height of the case. The resilient tabs 15 and 19 are deployed according to the height of the case, which makes it possible to decrease the dimension of the width of this element, i.e. in the direction which is perpendicular both to the height and to the longitudinal direction of the case. By way of example, the width of the articulating component according to the invention can be reduced to as much as 2 millimetres (mm). A smaller width of the case makes it possible to use a smaller width of the frame arm, which adds to the aesthetic attraction of the assembly.

Advantageously, the aperture 21 and the recess 17 are obtained simultaneously by perforating the base according to the height. In addition, the aperture 21 in the base 10 is concealed by securing the case against the frame arm 25. This arrangement also adds to the aesthetic attraction of the frame, and is thus distinguished from cases in which the apertures are provided in the width, and remain apparent.

It is intended to form a circular or semi-circular chamfer 27 on the edge of the through aperture 21, on the securing base 10 side, in order to prevent accumulation of solder around the periphery, or only on the front part of the perforation of the aperture, if the case is soldered to the frame arm.

The resilient tabs 15 and 19 of the socket 11 are inserted in retention areas 17 and 21 in the receptacle 5, in order to lock the socket 11 relative to the case 1, when the latter is displaced relative to the articulating knuckle 13 against the compression of the spring 7. FIGS. 3A and 3B show a preferred illustration of the locking socket 11 and of its two resilient tabs 15 and 19, disposed symmetrically relative to the axial direction A, which is perpendicular to the base 110 with a rectangular cross-section, of the socket. It should be noted that the end of the resilient tabs 15 and 19 is preferably rounded, in order to increase the support surface in the areas of retention 17 and 21 of the case.

It should also be noted that, when the socket 11, FIG. 1A, is fitted around the rod 34 and is guided by the complementary nature of the square cross-sections of the base of the socket 11 and of the end 30 of the rod 34, the two resilient tabs 15 and 19 distribute the compression force of the spring according to a resultant factor which is parallel to the slide 3. This results in reduction of the contact friction between the socket and the slide, thus limiting the resistance to sliding of the slide in the receptacle of the case, and protecting these two parts against premature wear.

FIGS. 2A and 2B show a preferred illustration of the slide 3. The guiding section S3 has a rectangular or polygonal shape, which is complementary to the guide cross-section of the receptacle 5. This arrangement makes it possible to connect the two elements in rotation. It should be noted that the end 30 of the rod 34 has a cross-section which is smaller than that of the guiding cross-section S3, in order to allow the resilient tabs to bend during insertion of the slide in the receptacle of the case.

It is proposed to replace the rod 34 of the slide by a wire made of a resistant material, such as a stainless steel or a hardened alloy. This wire is for example in the form of a roll, such that it can be crimped or soldered to the knuckle 13, and cut to a required length. It should be noted that at the moment of soldering the wire and the knuckle, the locking socket 11 and the spring 7 are not yet fitted around the wire, and are therefore not liable to be damaged by the soldering. High-frequency soldering or electric soldering can be used, with addition of a metal, or two compatible materials can be used, with electric welding without any addition.

Preferably, the stop 9 is formed by crushing carried out in the longitudinal direction of one end 32 of the rod 34 or of the wire. In FIG. 2A, the crushed end 32 is represented as a broken line. This arrangement provides simplification in the number of parts of the articulating component, by eliminating a stop element to be added, and providing a circular support ring for the spring.

According to another advantage of the invention, a wear or friction part 29 is fitted around the slide 3, between the case 1 and the knuckle 13. This part makes it possible firstly to maintain a maximum surface area on the contact surface between the case and the second articulating component for the frame, which abuts the case. Secondly, this part can limit the friction between the case and the cam-type knuckles of the second component, when the materials of the case and the knuckles are incompatible. According to this arrangement, the wear part 29 is fitted with insertion of the slide 3 in the receptacle 5 of the case.

The case of the resilient articulating component can be secured against a frame arm, as shown in FIGS. 1A and 1B, but can also be secured to the end of an arm. The case can be an integral part of the frame arm, by being machined at its end.

The slide is inserted into the case, together with the socket and the spring, after the case has been secured against the frame arm. In the event of soldering between the case and the frame arm, this method for assembly protects the spring against exposure to heat which would be detrimental to it.

The base for securing is an integral part of the case of the resilient articulating component. This arrangement facilitates soldering of the case to the frame arm. In the event of an open case, the base of which consists of the frame arm itself, additional precautions must be taken during soldering, since addition of excessive solder creates large chamfers on the lower periphery of the joint between the frame arm and the case. Raised solder along the walls of the case can thus be detrimental to translation of the slide inside the case.

The case with an integral base for securing makes it possible to produce simply the guiding section of the receptacle to guide the slide in translation. In an open case, the guiding section contributes towards securing the frame arm. In particular, the thickness of the soldering joint determines the height of the receptacle. A variation of height can thus introduce guiding play of the slide in the receptacle, in this direction.

I claim:

1. A resilient articulating component for an optical frame, comprising a case, a slide which is disposed inside the case, a spring which is fitted around the slide, between a stop and a locking socket, which itself is fitted around the slide, and an articulating knuckle, which is integral with the slide, and projects outside the case, wherein the socket has a resilient tab in order to lock the socket relative to the case, when the latter is displaced relative to the articulating knuckle, against the compression of the spring, the case having a receptacle to guide the slide in translation inside the case, and the resilient tab being inserted in a aperture in the case, which opens into the receptacle wherein the slide comprises a wire, which is crushed at one end, in order to form the stop for the spring.

* * * * *